US011320931B2

(12) United States Patent
Mesguich Havilio

(10) Patent No.: US 11,320,931 B2
(45) Date of Patent: *May 3, 2022

(54) SWIPE-BASED CONFIRMATION FOR TOUCH SENSITIVE DEVICES

(71) Applicant: Barnes & Noble College Booksellers, LLC, Basking Ridge, NJ (US)

(72) Inventor: Amir Mesguich Havilio, Palo Alto, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/227,728

(22) Filed: Apr. 12, 2021

(65) Prior Publication Data
US 2021/0232255 A1    Jul. 29, 2021

Related U.S. Application Data

(63) Continuation of application No. 16/707,573, filed on Dec. 9, 2019, now Pat. No. 10,976,856, which is a
(Continued)

(51) Int. Cl.
*H04M 1/725* (2021.01)
*B60K 37/06* (2006.01)
(Continued)

(52) U.S. Cl.
CPC .......... *G06F 3/0416* (2013.01); *G06F 3/017* (2013.01); *G06F 3/0481* (2013.01);
(Continued)

(58) Field of Classification Search
CPC .............. H04M 1/72583; B60K 37/06; B60K 2350/1004; B64G 1/22; G06Q 10/10;
(Continued)

(56) References Cited

U.S. PATENT DOCUMENTS 4,896,543 A    1/1990 Gullman
5,633,471 A    5/1997 Fukushima
(Continued)

FOREIGN PATENT DOCUMENTS

EP    0722150 A1    7/1996

OTHER PUBLICATIONS

Adonit Jot Touch (for iPad), Adonit Jot Touch (for iPad) Review & Rating—PCMag.com; http://www.pcmag.com/article2/0,2817,2411192,00.asp; 6 pages, printed from the Internet on Jun. 20, 2013.
(Continued)

*Primary Examiner* — Shourjo Dasgupta
(74) *Attorney, Agent, or Firm* — Finch & Maloney PLLC

(57) ABSTRACT

Techniques are disclosed for providing a swipe-based confirmation mode in electronic touch sensitive devices. The user can engage the confirmation mode by performing a command (e.g., delete or power down command), which causes the device to display a confirmation swipe gesture prompt. The confirmation prompt may be included within a confirmation graphic or a confirmation pop-up window. By performing the confirmation swipe gesture on the touch sensitive surface, the user may confirm the command. By not properly performing the confirmation gesture, closing a confirmation pop-up window, tapping an area of the screen not associated with the confirmation prompt, or otherwise not performing the confirmation swipe gesture, the device may cause the function to be cancelled.

20 Claims, 10 Drawing Sheets

Related U.S. Application Data continuation of application No. 15/477,762, filed on Apr. 3, 2017, now Pat. No. 10,503,346, which is a continuation of application No. 13/888,021, filed on May 6, 2013, now Pat. No. 9,612,740.

(51) Int. Cl.
| | | |
|---|---|---|
| B64G 1/22 | (2006.01) | |
| G06Q 10/10 | (2012.01) | |
| G09B 19/00 | (2006.01) | |
| G06F 11/22 | (2006.01) | |
| G06F 1/16 | (2006.01) | |
| G06F 3/01 | (2006.01) | |
| G06F 3/0481 | (2013.01) | |
| G06F 3/0482 | (2013.01) | |
| G06F 3/0485 | (2013.01) | |
| G06F 3/0488 | (2013.01) | |
| G06F 3/0489 | (2013.01) | |
| G06F 3/0484 | (2013.01) | |
| G06F 3/041 | (2006.01) | |
| G06F 3/04883 | (2022.01) | |
| G06F 3/04886 | (2022.01) | |

(52) U.S. Cl.
CPC ........ *G06F 3/0482* (2013.01); *G06F 3/04883* (2013.01); *G06F 3/04886* (2013.01); *G06F 2203/04803* (2013.01); *G06F 2203/04808* (2013.01)

(58) Field of Classification Search
CPC ............ G09B 19/0053; H04N 5/44543; G06F 17/30861; G06F 17/30274; G06F 9/4443; G06F 9/4446; G06F 11/2257; G06F 2203/04807; G06F 1/1626; G06F 1/1632; G06F 3/04895; G06F 3/0481; G06F 3/0489; G06F 3/011; G06F 3/04855; G06F 3/0482; G06F 3/04847; G06F 3/017; G06F 3/04845; G06F 3/04842; G06F 3/04817; G06F 3/0485; G06F 3/0488; G06F 3/04883

See application file for complete search history.

(56) References Cited

U.S. PATENT DOCUMENTS

| | | |
|---|---|---|
| 5,844,557 A | 12/1998 | Shively, II |
| 6,259,438 B1 | 6/2001 | Fleck et al. |
| 6,956,564 B1 | 10/2005 | Williams |
| 7,649,524 B2 | 1/2010 | Haim et al. |
| 7,840,912 B2 | 11/2010 | Elias et al. |
| 7,898,541 B2 | 3/2011 | Hong et al. |
| RE42,738 E | 9/2011 | Williams |
| 8,059,101 B2 | 11/2011 | Westerman et al. |
| 8,239,413 B2 | 8/2012 | Hubert |
| 8,274,536 B2 | 9/2012 | Chaudhri et al. |
| 8,286,104 B1 | 10/2012 | Yonge-Mallo |
| D670,713 S | 11/2012 | Cranfill et al. |
| RE44,103 E | 3/2013 | Williams |
| 8,400,417 B2 | 3/2013 | Ording et al. |
| 8,508,494 B2 | 8/2013 | Moore |
| 9,612,740 B2 | 4/2017 | Mesguich Havilio |
| 10,503,346 B2 | 12/2019 | Mesguich Havilio |
| 2001/0025289 A1 | 9/2001 | Jenkins et al. |
| 2002/0011988 A1 | 1/2002 | Sai et al. |
| 2002/0116421 A1 | 8/2002 | Fox et al. |
| 2003/0115167 A1 | 6/2003 | Sharif et al. |
| 2006/0058014 A1 | 3/2006 | Seo et al. |
| 2007/0047002 A1 | 3/2007 | Hull et al. |
| 2007/0150842 A1 | 6/2007 | Chaudhri et al. |
| 2008/0036747 A1 | 2/2008 | Hope |
| 2008/0094371 A1 | 4/2008 | Forstall et al. |
| 2008/0168403 A1 | 7/2008 | Westerman et al. |
| 2009/0007009 A1 | 1/2009 | Luneau et al. |
| 2009/0278806 A1 | 11/2009 | Duarte et al. |
| 2010/0100854 A1 | 4/2010 | Russell et al. |
| 2010/0188351 A1 | 7/2010 | Lee et al. |
| 2010/0192086 A1 | 7/2010 | Kocienda et al. |
| 2010/0229130 A1 | 9/2010 | Edge et al. |
| 2010/0259482 A1 | 10/2010 | Ball |
| 2010/0262659 A1 | 10/2010 | Christiansen et al. |
| 2010/0318895 A1 | 12/2010 | Steinberger et al. |
| 2011/0197153 A1 | 8/2011 | King et al. |
| 2011/0258542 A1 | 10/2011 | Kenney et al. |
| 2011/0263298 A1 | 10/2011 | Park |
| 2012/0013552 A1 | 1/2012 | Ahn |
| 2012/0056821 A1 | 3/2012 | Goh |
| 2012/0127110 A1 | 5/2012 | Amm et al. |
| 2012/0139879 A1 | 6/2012 | Kim et al. |
| 2012/0221938 A1 | 8/2012 | Patterson et al. |
| 2012/0235901 A1 | 9/2012 | Binder |
| 2012/0242579 A1 | 9/2012 | Chua |
| 2012/0242584 A1 | 9/2012 | Tuli |
| 2012/0249768 A1 | 10/2012 | Binder |
| 2012/0280947 A1 | 11/2012 | Weaver et al. |
| 2012/0311438 A1 | 12/2012 | Cranfill et al. |
| 2012/0322507 A1 | 12/2012 | Ukai |
| 2012/0329529 A1 | 12/2012 | van der Raadt |
| 2013/0016045 A1 | 1/2013 | Zhao et al. |
| 2013/0036383 A1 | 2/2013 | Kuan et al. |
| 2013/0063364 A1 | 3/2013 | Moore |
| 2013/0076632 A1 | 3/2013 | Sirpal et al. |
| 2013/0076637 A1 | 3/2013 | Teltz |
| 2013/0076638 A1 | 3/2013 | Sirpal et al. |
| 2013/0076781 A1 | 3/2013 | Sirpal et al. |
| 2013/0111412 A1 | 5/2013 | Sura et al. |
| 2013/0113699 A1 | 5/2013 | Lim |
| 2013/0120271 A1 | 5/2013 | Lee et al. |
| 2013/0135234 A1 | 5/2013 | Hisano et al. |
| 2013/0139078 A1 | 5/2013 | Chuang et al. |
| 2013/0139107 A1 | 5/2013 | Jung |
| 2013/0162532 A1 | 6/2013 | Cheng et al. |
| 2013/0174042 A1 | 7/2013 | Kim et al. |
| 2013/0185680 A1 | 7/2013 | Chaudhri et al. |
| 2013/0194308 A1 | 8/2013 | Privault et al. |
| 2013/0246916 A1 | 9/2013 | Reimann et al. |
| 2013/0332856 A1 | 12/2013 | Sanders et al. |
| 2014/0331175 A1 | 11/2014 | Mesguich Havilio |
| 2015/0212683 A1 | 7/2015 | Arita et al. |
| 2017/0205963 A1 | 7/2017 | Mesguich Havilio |
| 2020/0110513 A1 | 4/2020 | Mesguich Havilio |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the internet on Jun. 20, 2013.

"Apple Secretly Filed Three Dynamic Smart Pen Patents in Europe that are Chock Full of Cool Ideas", http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus", Wacom Americas, http://www.wacom.com/en/products/stylus, 5 pages, printed from the Internet on Jun. 20, 2013.

Robertson, Adi, "Blue Tiger Pressure-Sensitive iOS Stylus Will Work over Bluetooth 4.0", http://www.theverge.com/2012/3/7/2851562/blue-tiger-pressure-ten-one-design-pressure-sensitive-bluetooth-4-0-stylus, 1 page, printed from the Internet on Aug. 2, 2013.

Malacria et al., "Clutch-Free Panning and Integrated Pan-Zoom Control on Touch-Sensitive Surfaces: The CycloStar Approach", CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

(56) References Cited

OTHER PUBLICATIONS

"Easing functions," Easing Functions Cheat Sheet, http://easings.net/, 3 pages, printed from the Internet on Jun. 17, 2013.
Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.
"EMR (Electro-Magnetic Resonance) Technology—The De Facto Standard for Pen Tablet Devices is Realized using EMR Technology," Wacom Components : Input Technology: EMR Technology, http://wacom-components.com/english/technology/emr.html, 5 pages, printed from the Internet on Aug. 2, 2013.
"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.
"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.
"Guidelines for selecting text and images (Windows Store apps)," http://msdn.microsoft.com/en-us/library/windows/apps/hh465334, 5 pages, printed from the Internet on Jun. 20, 2013.
Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.
"How do Wacom tablets work?," tablet4u.co.uk, http://www.tablet4u.co.uk/techinfo.html, 2 pages, printed from the Internet on Jun. 20, 2013.
Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown—6 pages, printed from the Internet on Nov. 3, 2012.
"Desktop Touchscreens,"—Desktop touchscreens explained, http://www.touchscreenmagazine.nl/touchscreen-solutions/desktop-touchscreens, 1 page, printed from the Internet on Nov. 3, 2012.
"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.
"Padblue 2," Brando—mobile.brando.com, http://mobile.brando.com/Padblue-2_p9162c1577d94.html., 4 pages, printed from the Internet on May 10, 2013.
Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.
"Bluetooth 4.0 SmartPen The future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," Brando—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 5 pages, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Jun. 11, 2013.
"Screen hotspot," Wikipedia, the free encyclopedia, http://en.wikipedia.org/wiki/Screen_hotspot, 1 page, printed from the Internet on May 15, 2013.
"PAiA—Touch Switches," PAiA Corporation USA, 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=, 1 page, printed from the Internet on Jan. 15, 2013.
Clark, Josh, "iPhone App Design: When An Awkward Interface Makes Sense," Published: Mar. 8, 2011. 6 pages.
"JQuery: Dragable DIV To Fade Between Images?". Published: Oct. 5, 2012. 2 pages.
Matthews, Andy, "Adding iPhone Stype Swipe to Delete Button To A ListView Compondent in JQuery Mobile," Published: Feb. 18, 2011. 12 pages.
"Android 'Swipe Left to Right To Delete', Gesture On List Item, ICS Style", Published: Feb. 25, 2013. 2 pages.
Mundhra, Ashish , "How to Shutdown Windows 8 Desktop, Laptop and Tablets", published on Mar. 7, 2012 to https:// www.guidingtech.com/10086/shutdown-ways-windows-8-laptop-desktop-tablets/, retrieved on Jun. 16, 2020 (Year: 2012).
U.S. Appl. No. 16/707,576, filed Dec. 9, 2019, Pending.
U.S. Appl. No. 15/477,762, filed Apr. 3, 2017, Patented.
U.S. Appl. No. 13/888,021, filed May 6, 2013, Patented.

SWIPE-BASED CONFIRMATION FOR TOUCH SENSITIVE DEVICES

This application is a continuation of U.S. application Ser. No. 16/707,576 filed Dec. 9, 2019, which is a continuation of U.S. application Ser. No. 15/477,762 filed Apr. 3, 2017 (now U.S. Pat. No. 10,503,346), which is a continuation of U.S. application Ser. No. 13/888,021 filed May 6, 2013 (now U.S. Pat. No. 9,612,740). These applications are herein incorporated by reference in their entirety.

FIELD OF THE DISCLOSURE

This disclosure relates to electronic display devices, and more particularly, to user interface (UI) techniques for interacting with touch screen devices.

BACKGROUND

Electronic display devices such as tablets, eReaders, mobile phones, smartphones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figure 1A:
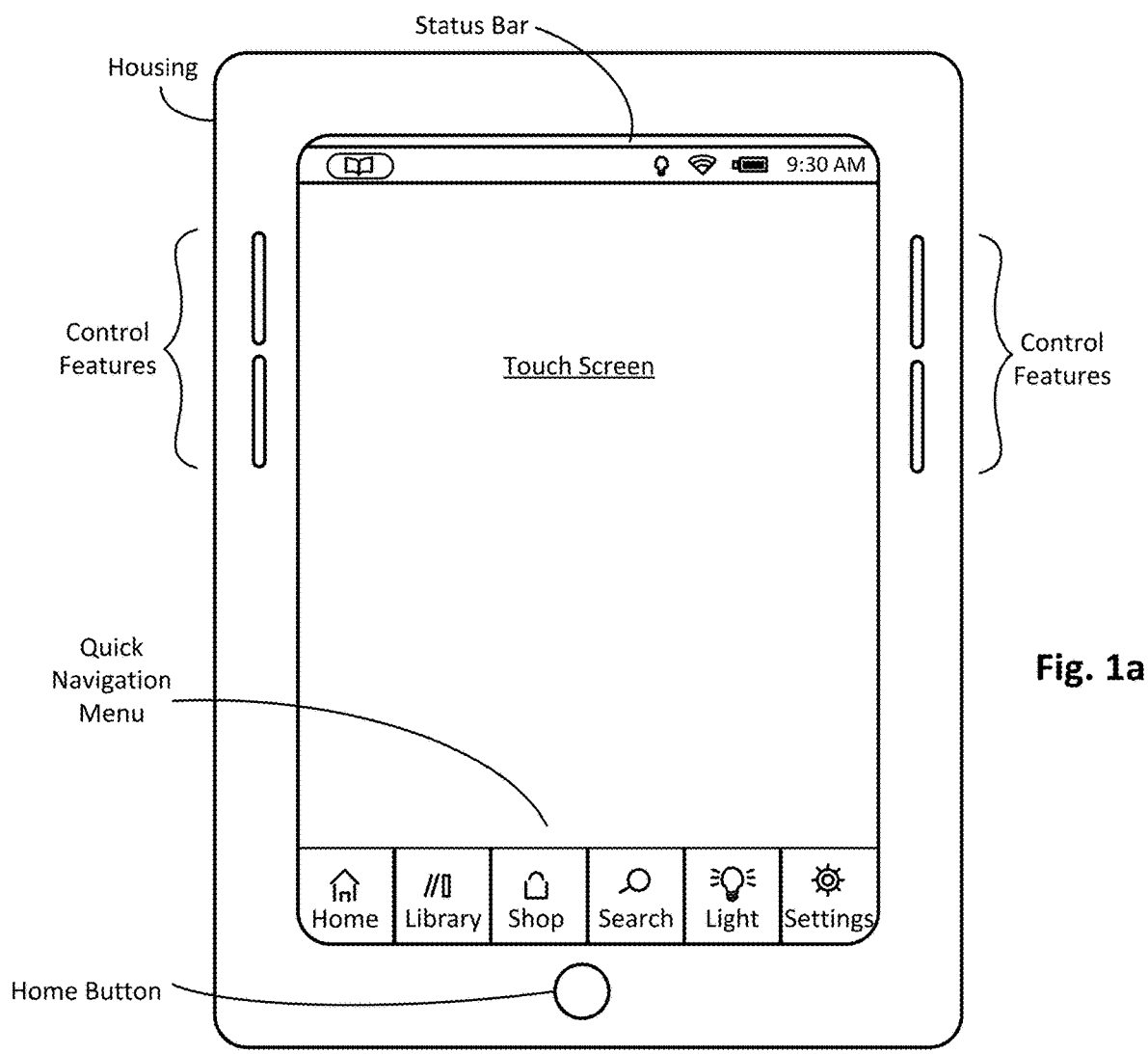
FIGS. 1a-b illustrate an example electronic touch screen device having a swipe-based delete confirmation mode configured in accordance with an embodiment of the present invention.

Techniques are disclosed for providing a swipe-based delete confirmation mode in electronic touch sensitive devices. The user can engage the delete confirmation mode by performing a delete command, which may cause the device to display a delete confirmation swipe gesture prompt. The delete confirmation prompt may be included, for example, within a delete confirmation graphic or a delete confirmation pop-up window. In some such embodiments, the delete confirmation graphic or pop-up window may include a delete confirmation path that visually shows where the user must perform the delete confirmation swipe gesture. In some such cases, this delete confirmation path may also include a virtual UI push-button at the end of the path. By performing the delete confirmation swipe gesture on the touch sensitive surface, the user may confirm the delete command. In some embodiments, if the user does not properly trace the delete confirmation swipe path, closes a delete confirmation pop-up window, taps an area of the screen not associated with the delete confirmation prompt, or otherwise fails to perform the delete confirmation swipe gesture, the device may cause the delete function to be abandoned. In some embodiments, an animation and/or sound further confirms the deletion process, such as a crumpling paper animation or a swooshing sound after the swipe gesture is performed.

General Overview

As previously explained, electronic display devices such as tablets, eReaders, and smartphones are commonly used for displaying user interfaces and consumable content. The user of such devices can typically consume the displayed content with relative ease. In some instances, the user may wish to delete a portion of the given content or delete one or more files or items on the device. While available content deleting techniques are commonly provided with touch screen devices for such purposes and sometimes include delete confirmation, a swipe-based delete confirmation mode as described herein may provide a more intuitive or otherwise positive user experience.

Thus, and in accordance with an embodiment of the present invention, swipe based delete confirmation techniques are disclosed for use in electronic touch screen devices. The content being deleted may include, for example, text, graphics, images, folders/files, embedded audio and/or video files, and/or any other consumable content. Once content is selected, any number of suitable UI control features (e.g., delete/copy/cut/paste/format UI press-buttons) can be provided to the user, depending on the given context and application in which the user is operating, as well as capabilities of the device. Such example UI control features can be displayed automatically to the user once the content is selected, in accordance with some embodiments. Given the global nature and/or uniqueness of the engagement mechanism, in accordance with some embodiments, the delete confirmation mode can be similarly invoked within multiple diverse applications (e.g., eBook, browser, picture viewer, file manager, etc.) and without conflicting with other global gestures that might also be used by the device's operating system.

The user can engage the delete confirmation mode by selecting a delete command using an options menu, pressing a delete virtual push-button on a touch screen, pressing a delete button of a keyboard that is connected to the electronic device, or any other suitable user input means. Once the delete command has been performed, the delete confirmation mode may prompt the user to perform a delete confirmation swipe gesture. As used herein, a swipe gesture may include a sweeping or dragging gesture across at least a portion of the touch sensitive surface; whether directly contacting that surface or hovering over that surface (e.g., within a few centimeters). In some embodiments, the swipe gesture may be performed at a constant speed in one single direction, while in other embodiments the swipe gesture may follow a curved path. The gestures can be performed, for example, with the tip of a finger or a stylus, or any other suitable implement capable of providing a detectable swipe gesture. In some embodiments, the delete command and the delete confirmation mode may be combined into one continuous gesture. In one such example embodiment, a delete confirmation graphic may include a virtual delete UI push-button, and the user may press the delete UI push-button and immediately perform the delete confirmation swipe gesture to confirm the delete command. In other embodiments, a virtual or physical delete UI push-button may be separate from any delete confirmation gesture prompt. Once the user is prompted to perform the delete confirmation swipe gesture, the user may perform the swipe gesture and confirm the delete function, or abandon the delete function by not confirming the gesture.

In some embodiments, the user may abandon the delete function by, for example, closing a delete confirmation pop-up window, tapping an area of the screen away from a delete confirmation graphic, waiting a specified period of time (e.g., five seconds) without performing the delete confirmation gesture, or retracing a delete confirmation swipe gesture that is at least partially performed. In some embodiments, the items to be deleted may diminish in appearance gradually as the delete confirmation swipe gesture is being performed, and gradually reappear if the user retraces an at least partially completed delete confirmation gesture.

Architecture

Figure 1B:
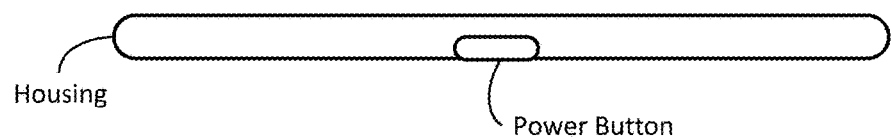

FIGS. 1a-b illustrate an example electronic touch sensitive device having a delete confirmation mode configured in accordance with an embodiment of the present invention. As can be seen, in this example embodiment, the touch sensitive surface is a touch screen display. The device could be, for example, a tablet such as the NOOK® tablet or eReader by Barnes & Noble. In a more general sense, the device may be any electronic device having a touch sensitive user interface for detecting direct touch or otherwise sufficiently proximate contact, and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated, the claimed invention is not intended to be limited to any specific kind or type of electronic device.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or UI features, or device form factor.

In this example configuration, the home button is a physical press-button that can be used as follows: when the device is awake and in use, pressing the button will display the quick navigation menu, which is a toolbar that provides quick access to various features of the device. The home button may also be configured to cease an active function that is currently executing on the device (such as an unconfirmed delete function) or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
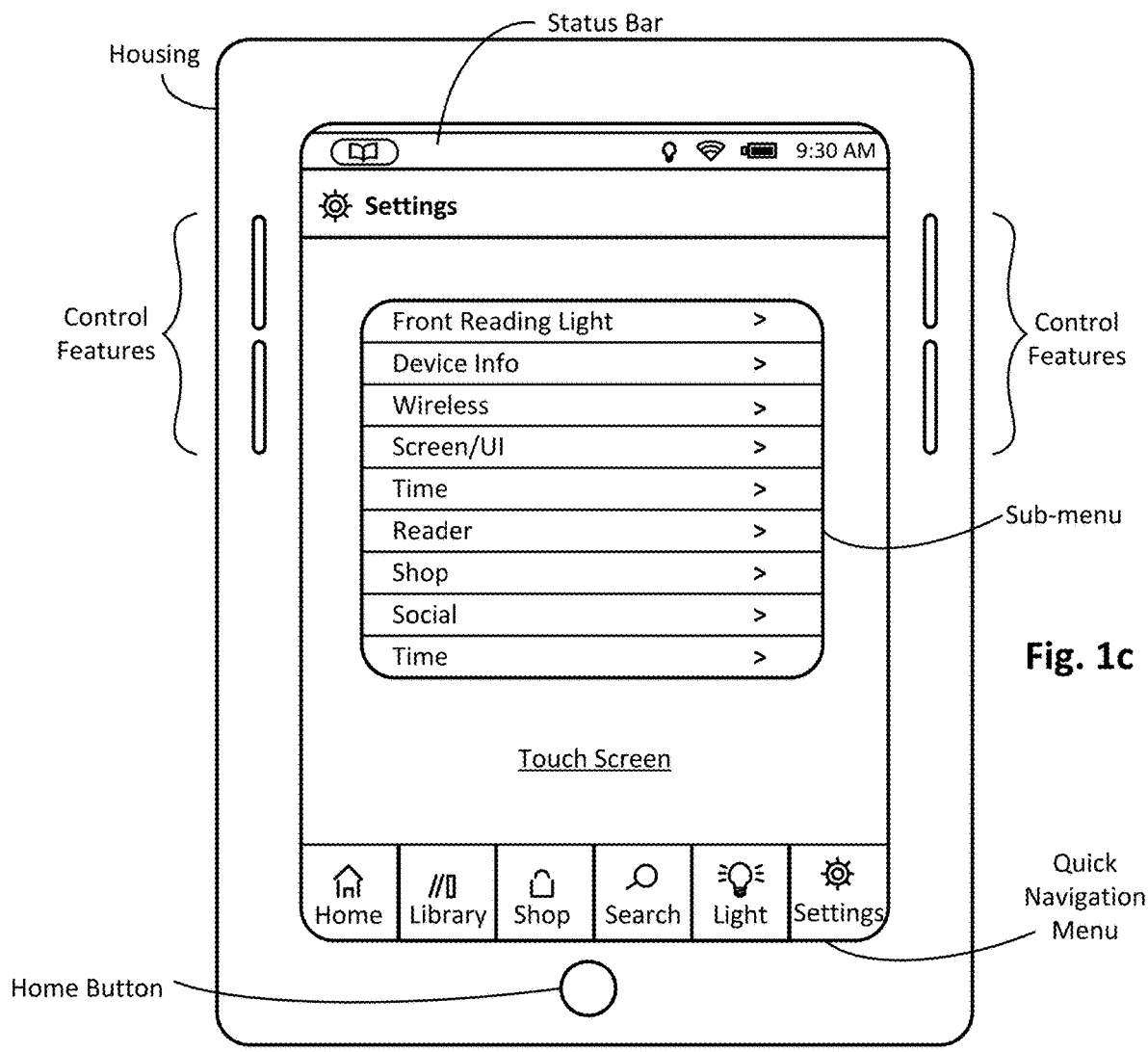
FIGS. 1c-d illustrate example configuration screen shots of the user interface of the electronic touch screen device shown in FIGS. 1a-b, configured in accordance with an embodiment of the present invention.
Figure 1D:
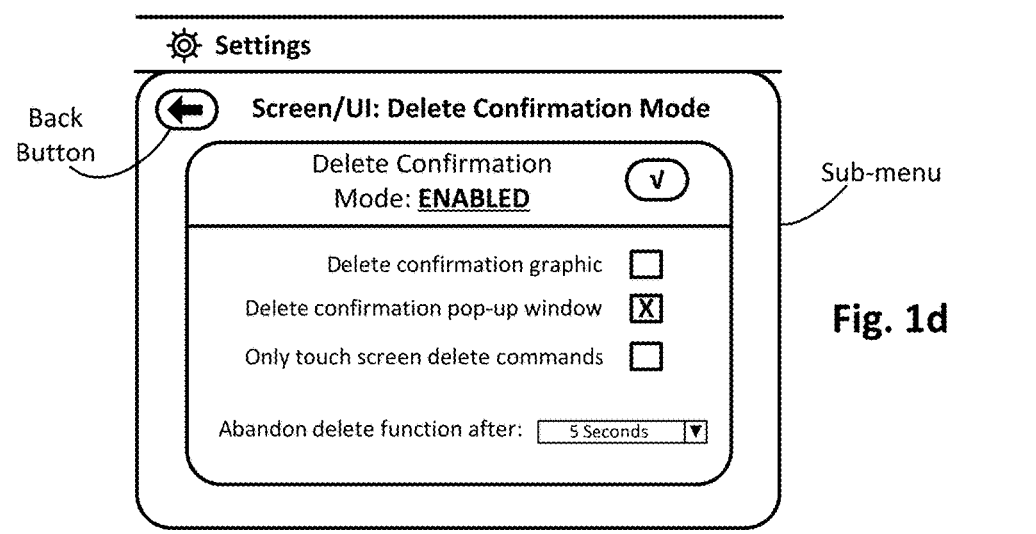

In one particular embodiment, a delete confirmation mode configuration sub-menu, such as the one shown in FIG. 1d, may be accessed by selecting the Settings option in the quick navigation menu, which causes the device to display the general sub-menu shown in FIG. 1c. From this general sub-menu, the user can select any one of a number of options, including one designated Screen/UI in this specific example case. Selecting this sub-menu item may cause the configuration sub-menu of FIG. 1d to be displayed, in accordance with an embodiment. In other example embodiments, selecting the Screen/UI option may present the user with a number of additional sub-options, one of which may include a so-called "delete confirmation mode" option, which may then be selected by the user so as to cause the delete confirmation mode configuration sub-menu of FIG. 1*d* to be displayed. Any number of such menu schemes and nested hierarchies can be used, as will be appreciated in light of this disclosure. In other embodiments, the delete confirmation function is hard-coded such that no configuration sub-menus are needed or otherwise provided (e.g., performing a swipe gesture to confirm a delete command as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a touch (direct or hovering, by a user's hand, a stylus, or any other suitable implement) in a given location into an electrical signal which is then received and processed by the device's underlying operating system (OS) and circuitry (processor, etc.). In some instances, note that the user need not actually physically touch the touch sensitive device to perform an action. For example, the touch screen display may be configured to detect input based on a finger or stylus hovering over the touch sensitive surface (e.g., within 3 inches of the touch screen). Additional example details of the underlying OS and circuitry in accordance with some embodiments will be discussed in turn with reference to FIG. 2*a*.

The touch sensitive surface (or touch sensitive display, in this example case) can be any surface that is configured with touch detecting technologies, whether capacitive, resistive, acoustic, active-stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch sensitive controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case).

As previously explained, and with further reference to FIGS. 1*c* and 1*d*, once the Settings sub-menu is displayed (FIG. 1*c*), the user can then select the Screen/UI option. In response to such a selection, the delete confirmation mode configuration sub-menu shown in FIG. 1*d* can be provided to the user. The user can configure a number of functions with respect to the delete confirmation mode, in this example embodiment. For instance, in this example case, the configuration sub-menu includes a UI check box that when checked or otherwise selected by the user, effectively enables the delete confirmation mode (shown in the enabled state); unchecking the box disables the mode. Other embodiments may have the delete confirmation mode always enabled or enabled by a physical switch or button located on the device, for example. As previously explained, the delete confirmation mode may be implemented using a delete confirmation graphic, or a delete confirmation pop-up window. In this particular example, the user may configure how the delete confirmation mode may be implemented by selecting a UI check box associated with either a confirmation graphic or a confirmation pop-up window. In this particular embodiment, the user has selected the delete confirmation pop-up window option.

With further reference to the example embodiment of FIG. 1*d*, the user has the option to have the delete confirmation mode activated only when a delete command is received through the touch sensitive display, as opposed to a delete command received from a wireless keyboard, for example. In this particular example, this check box is not selected, and therefore all delete commands will activate the delete confirmation mode. In some embodiments the user may specify a certain time period in which the delete confirmation gesture must be performed before the delete command is abandoned. In this particular example, the user has selected a time limit of five seconds, such that if the delete command is not confirmed after five seconds, the delete command is abandoned or otherwise times out.

In some example embodiments, the user may specify a number of applications in which the delete confirmation mode can be invoked. Such a configuration feature may be helpful, for instance, in a tablet or laptop or other multi-function computing device that can execute different applications (as opposed to a device that is more or less dedicated to a particular application). In such an example, the available applications may be provided along with a corresponding check box, pull-down menu, or some other suitable UI feature. Example applications may include an eBook application, a video player application, a browser application, a file manager application, a word processor application, a document viewer application, which are just a few examples. Any number of applications or device functions may benefit from a delete confirmation mode as provided herein, whether user-configurable or not, and the claimed invention is not intended to be limited to any particular application or set of applications. In some embodiments, the delete confirmation mode may be enabled on a content-specific level (e.g., only for deleting text), an application-specific level (e.g., only when running a file browsing application), or on a global level wherein a user must confirm a delete command regardless of the application running or type of content being deleted.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1*d* is presented merely as an example of how a delete confirmation mode may be configured by the user, and numerous other configurable or hard-codable aspects will be apparent in light of this disclosure. Note that in some embodiments the delete confirmation mode may be visually and/or aurally demonstrated or otherwise confirmed to the user via animations or sound effects. Such animations and sound effects provide clarity to the function being performed or otherwise enhance the user experience. In some embodiments, the animations and/or sound effects may be user-configurable, while in other embodiments they are hard-coded.

Figure 2A:
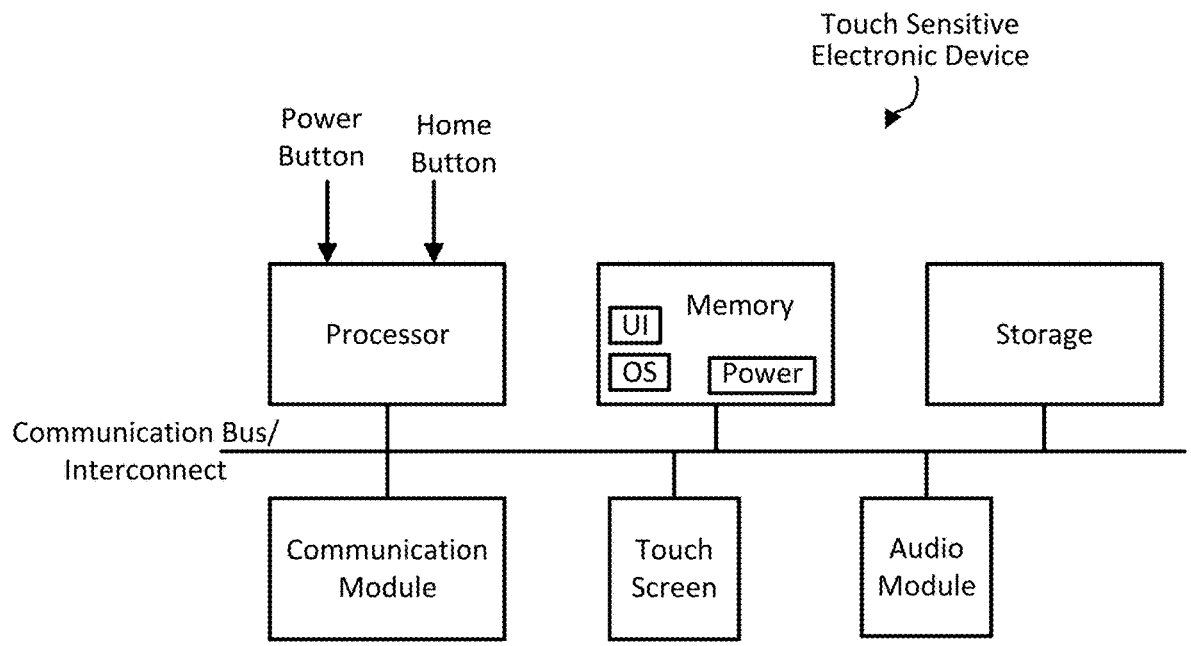
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's contact (direct or proximate) with the screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a delete confirmation mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 6-inch E-ink Pearl 800×600 pixel screen with Neonode® zForce® touchscreen, or any other suitable display and touchscreen interface technology. The communications module can be, for instance, any suitable 802.11 b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 6.5" high by about 5" wide by about 0.5" thick and weighs about 6.9 ounces. Any number of suitable form factors can be used, depending on the target application (e.g., laptop, desktop, mobile phone, etc). The device may be smaller, for example, for smartphone and tablet applications and larger for smart computer monitor and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touchscreen technology and the various example screen shots and use-case scenarios shown in FIGS. 1a, 1c-d, 3a-c, 4a-d, 5a-b, and 6a-c, and in conjunction with the delete confirmation mode methodologies demonstrated in FIG. 7, which will be discussed in turn. The audio module can be configured to speak or otherwise aurally present, for example, delete confirmations, a selected eBook, or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
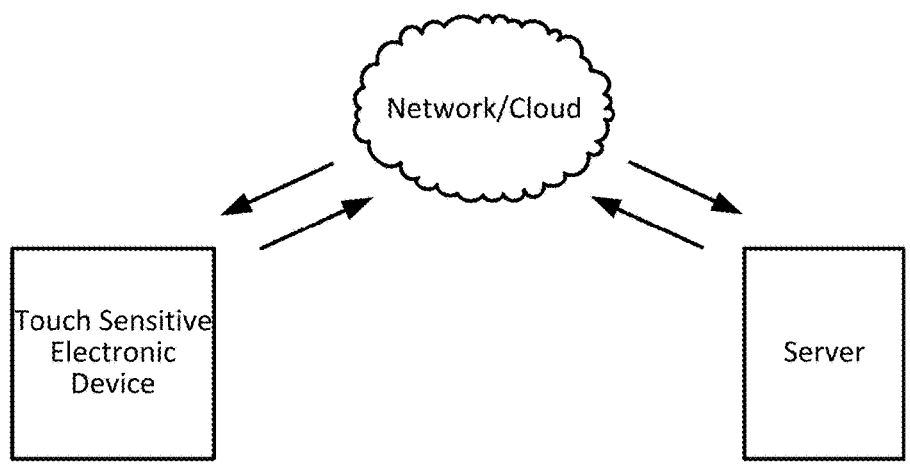
FIG. 2b illustrates a block diagram of a communication system including the electronic touch screen device of FIG. 2a, configured in accordance with an embodiment of the present invention.

FIG. 2b illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. Is some such embodiments, the server is configured to remotely provision a delete confirmation mode as provided herein to the touch screen device (e.g., via JavaScript or other browser-based technology). In other embodiments, portions of the delete confirmation methodology are executed on the server and other portions of the methodology are executed on the device. Numerous server-side/client-side execution schemes can be implemented to facilitate a delete confirmation mode in accordance with an embodiment, as will be apparent in light of this disclosure.

Delete Confirmation Mode Examples

Figure 3A:
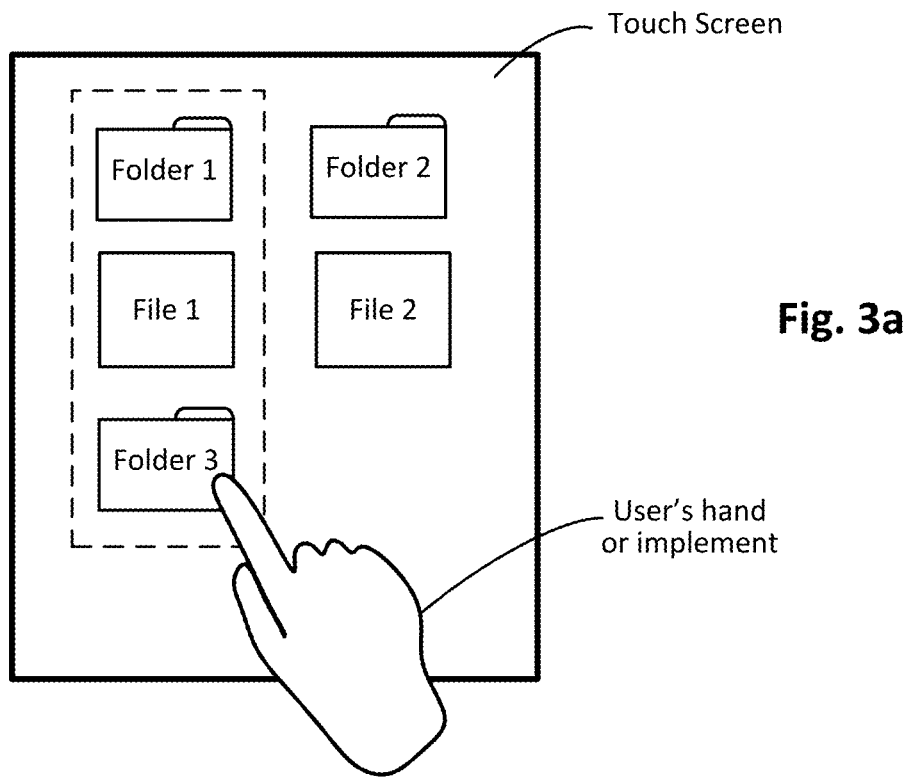
FIGS. 3a-c illustrate an example swipe-based delete confirmation mode of an electronic touch screen device, in accordance with an embodiment of the present invention.
Figure 3B:
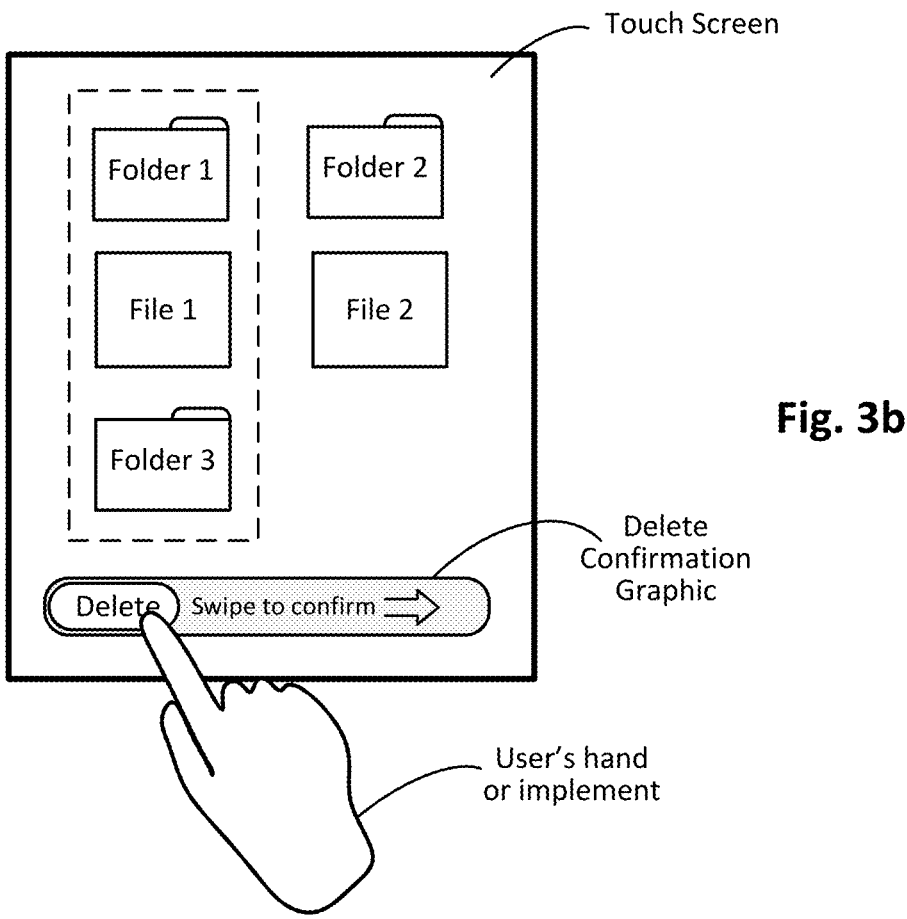
Figure 3C:
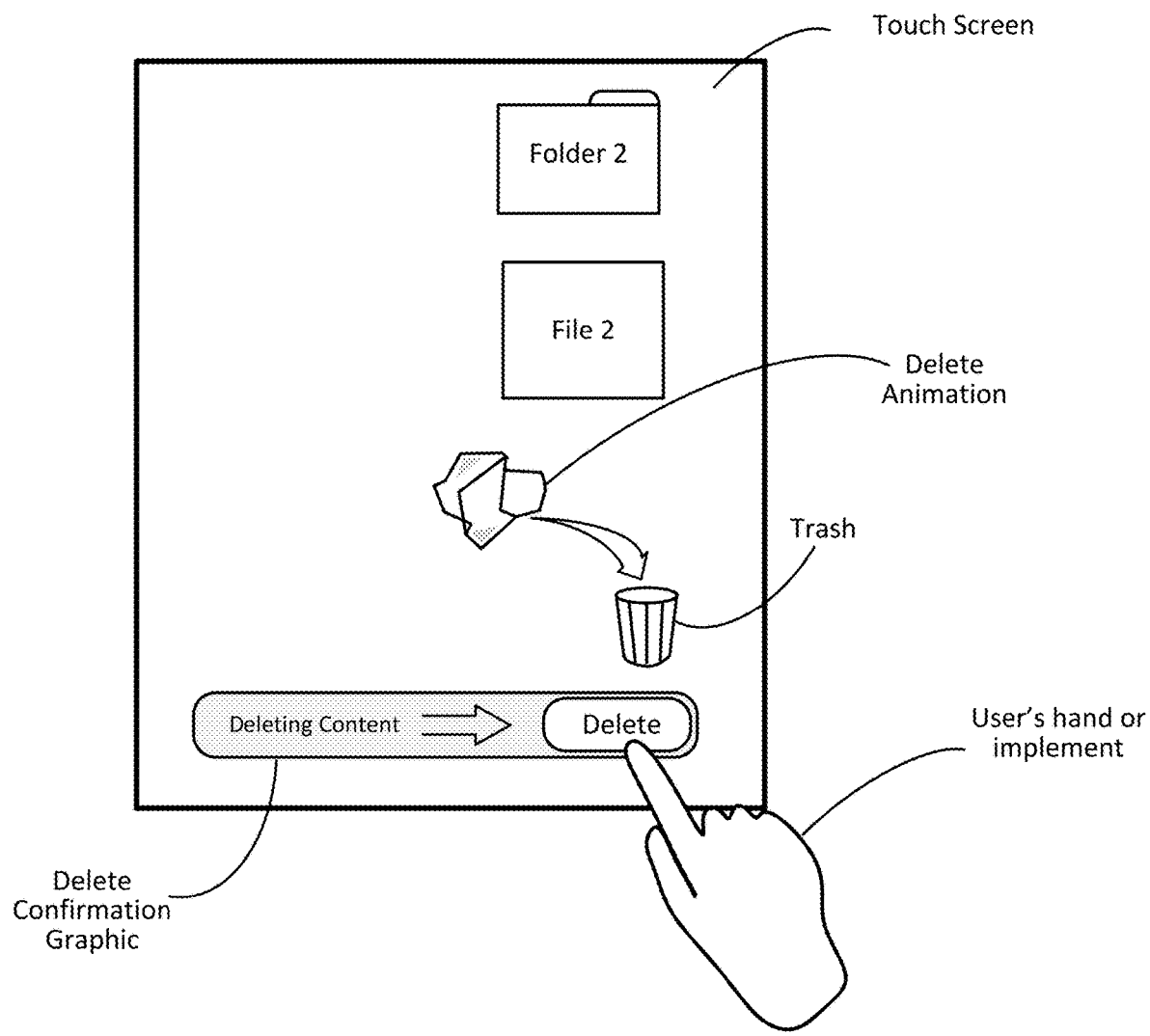

FIGS. 3a-c collectively illustrate an example delete confirmation mode that can be applied to a touch sensitive display of an electronic device, in accordance with an embodiment of the present invention. As can be seen, the touch screen of the device is displaying three folders and two files, and the user can interact with the touch screen with a hand or other suitable implement. In the particular example shown in FIG. 3a, the user has selected Folder 1, Folder 3, and File 1, as indicated by the dashed line surrounding the selected content. Content may be selected in any suitable manner using a stylus, the user's finger, or any other selection method. Such optional outlining or highlighting may assist the user in identifying what data will be deleted before performing the action. As used herein, highlighting may refer, for example, to any visual and/or aural indication of a content selection, which may or may not include a formatting change. In one particular embodiment, the highlighting function may outline a selected file, thus indicating that performing the delete confirmation gesture will delete that particular file.

In some embodiments, once content is selected a delete confirmation graphic may be displayed to the user, as shown in FIG. 3b. In this particular example, the delete confirmation graphic includes a delete UI button, as well as a swipe path which prompts the user to slide the delete button along a given path in order to confirm the delete function. In one such embodiment, the user may press the delete button with a finger and swipe that finger along the delete confirmation path in a single fluid gesture, as shown in FIGS. 3b-c. In this particular example embodiment, the delete confirmation path is a straight line from left to right along the touch screen device, although any number of delete confirmation path orientations and shapes may be implemented, including curved delete confirmation paths in some embodiments. In other embodiments, a delete UI button may be displayed initially without an accompanying confirmation swipe path, and the delete confirmation path may be displayed only after the user has pressed the delete button. In some embodiments, content deletion may begin when the delete confirmation swipe gesture has been fully completed. In some embodiments a delete UI button need not be displayed or dragged along the delete confirmation path. In such an embodiment the user may simply swipe a finger along the delete confirmation path to perform the delete function without dragging a UI feature along the path. In the particular embodiment shown in FIG. 3a, the delete confirmation function is accompanied by a delete animation showing a crumpled paper going into a trash bin. The various dimensions and features of the delete confirmation graphic and delete confirmation path may be user configurable (e.g., via a configuration sub-menu) or hard coded, in some embodiments.

Figure 4A:
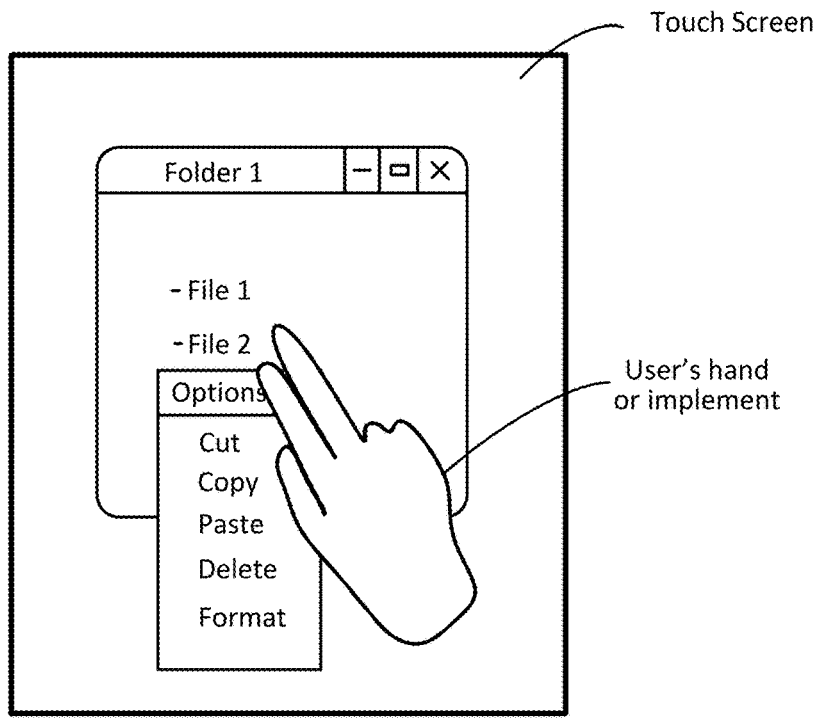
FIGS. 4a-d illustrate an example swipe-based delete confirmation mode of an electronic touch screen device, in accordance with another embodiment of the present invention.
Figure 4B:
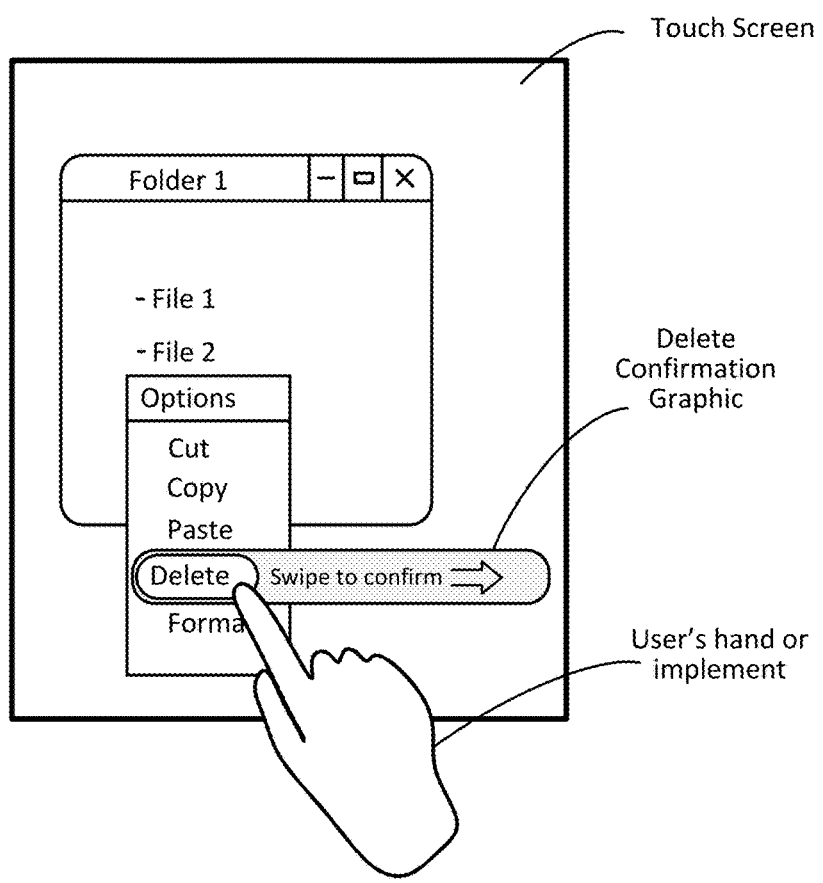
Figure 4C:
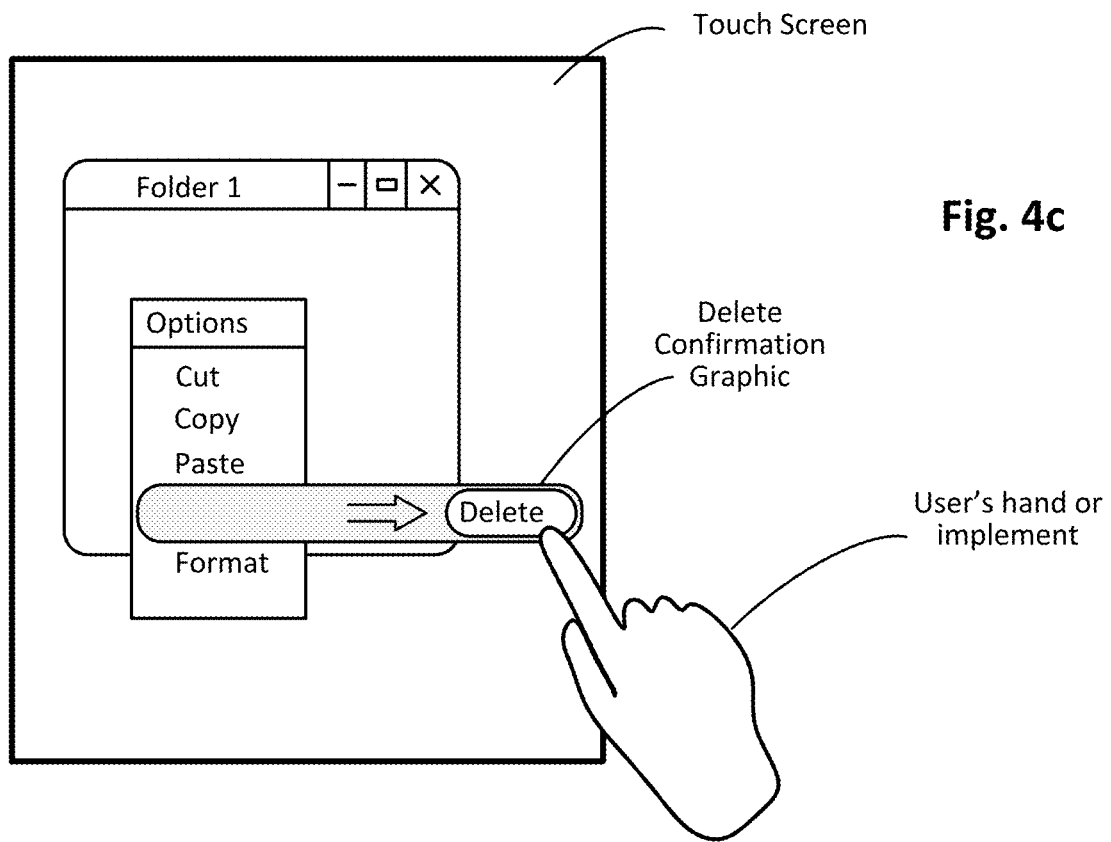
Figure 4D:
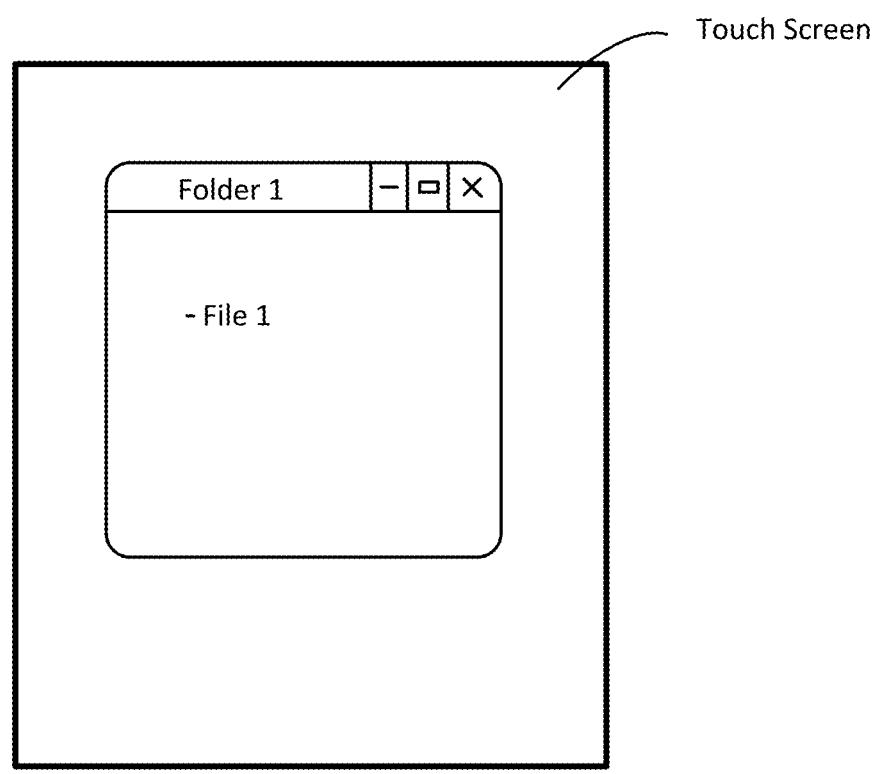

FIGS. 4a-d collectively illustrate an example delete confirmation mode that can be applied to a touch sensitive display of an electronic device, in accordance with another embodiment of the present invention. As can be seen, the touch screen of the device is displaying the contents of a folder, which include two files, and the user can interact with the touch screen with a hand or other suitable implement. In this particular embodiment, when the user performs a two-contact tap with two fingers, as shown, an options menu displays a number of commands to the user including cut, copy, paste, delete, and format. In this example, the user has performed a two-contact tap on File 2 and the options menu is being displayed. Furthermore, in this particular example, the delete confirmation mode is configured to display a delete confirmation graphic when the delete option of the options menu is selected. As seen in FIG. 4b, when the user taps the delete option within the options menu, the delete confirmation graphic appears prompting the user to drag the delete UI button along a delete confirmation path. In this example, the user may perform a swipe gesture along the delete confirmation path to confirm the delete command, as shown in FIG. 4c. As further shown in the example in FIG. 4d, File 2 is deleted when the delete confirmation swipe has been fully performed. In addition, the options menu automatically disappears or is otherwise closed.

Figure 5A:
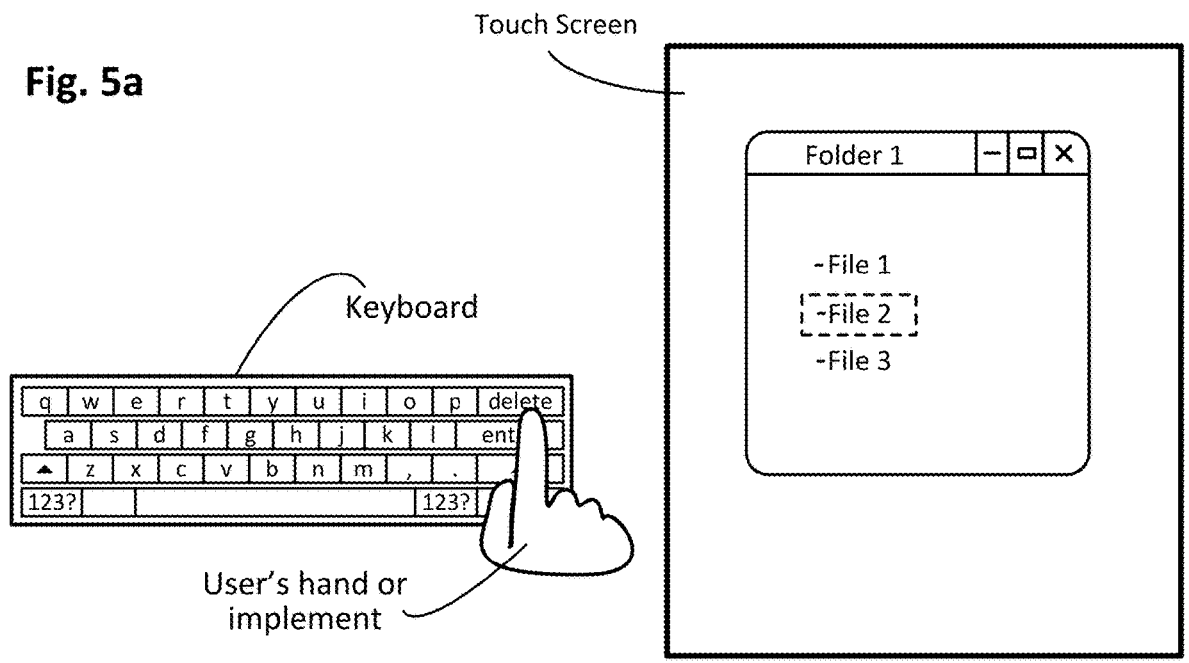
FIGS. 5a-b illustrate an example swipe-based delete confirmation mode of an electronic touch screen device, in accordance with another embodiment of the present invention.
Figure 5B:
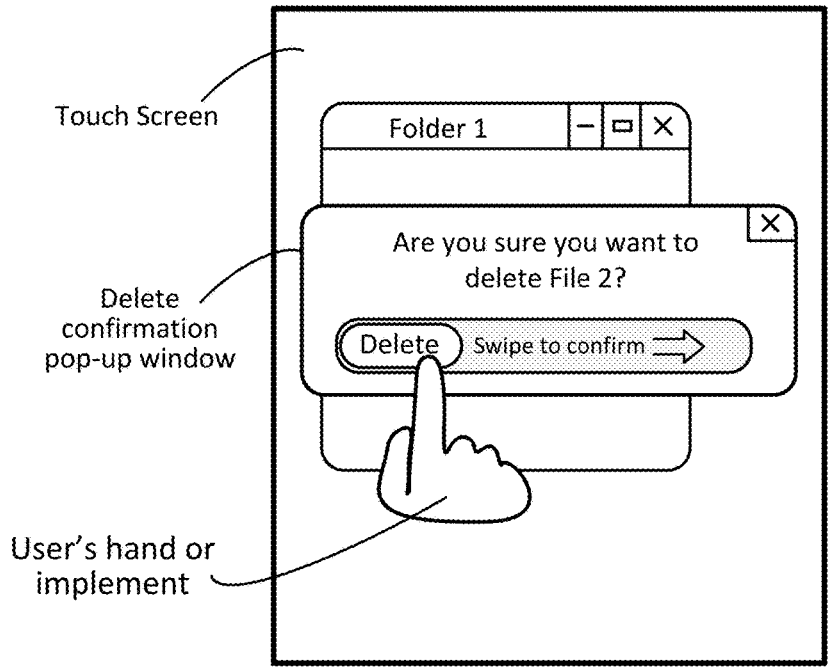

FIGS. 5a-b collectively illustrate an example delete confirmation mode that can be applied to a touch sensitive display of an electronic device coupled with a keyboard, in accordance with an embodiment of the present invention. As can be seen, the touch screen of the device is displaying the contents of Folder 1, which include three files, and the user can interact with the touch screen using a hand or other suitable implement. In addition, the electronic device is wirelessly connected with a keyboard in this example embodiment. In this example, the user has selected File 2 within Folder 1, as indicated by the dashed line surrounding File 2. Content may be selected in any suitable manner using a stylus, the user's finger, or any other selection method. Such optional outlining or highlighting may assist the user in identifying what data will be deleted before performing the delete action. In this example, after selecting File 2, the user presses the delete button of the physical keyboard that is connected to the electronic touch sensitive device.

In this particular example the delete confirmation mode is configured to display a delete confirmation pop-up window when a delete command is received. As shown in FIG. 5b, the delete confirmation pop-up window includes a delete UI button, as well as a swipe path which prompts the user to slide the delete button along a given path in order to confirm the delete function. Another embodiment may only include the swipe path. Performing a swipe gesture with the user's finger or other implement will successfully delete File 2. If the user does not wish to confirm the delete command, the user may close the window using the "X" UI graphic at the top corner of the delete confirmation pop-up window, in some embodiments. In other embodiments, the delete confirmation pop-up window may include a timer that may abandon the delete command after a certain period of time (e.g., five seconds) if the delete confirmation swipe gesture is not performed. In some such embodiments, the time limit for confirming the delete command may be user configurable (e.g., using a configuration sub-menu like the one shown in FIG. 1d), or hard coded.

Figure 6A:
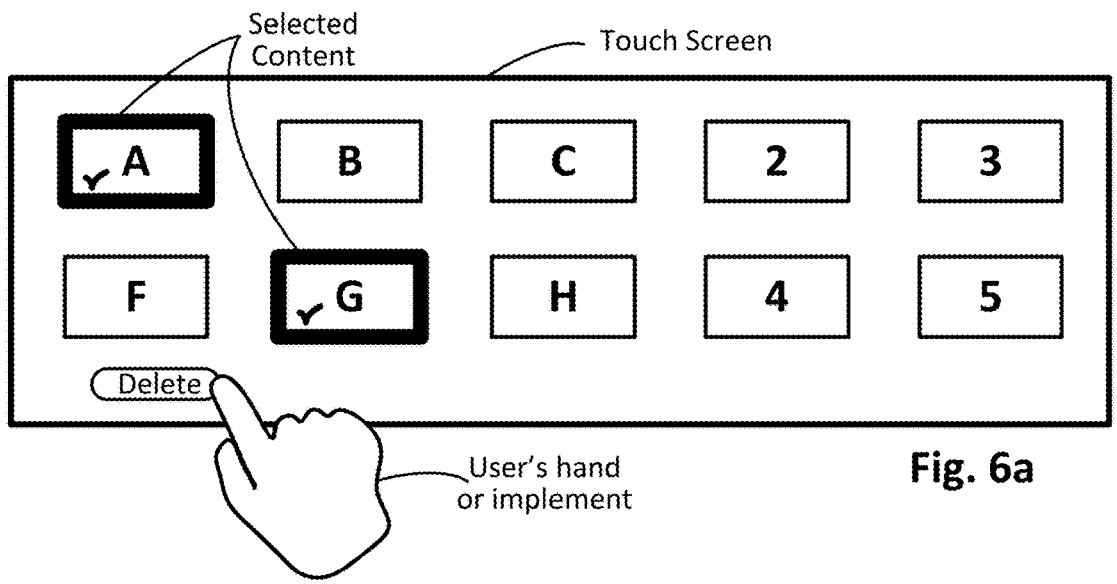
FIGS. 6a-c illustrate an example swipe-based delete confirmation mode of an electronic touch screen device, in accordance with another embodiment of the present invention.
Figure 6B:
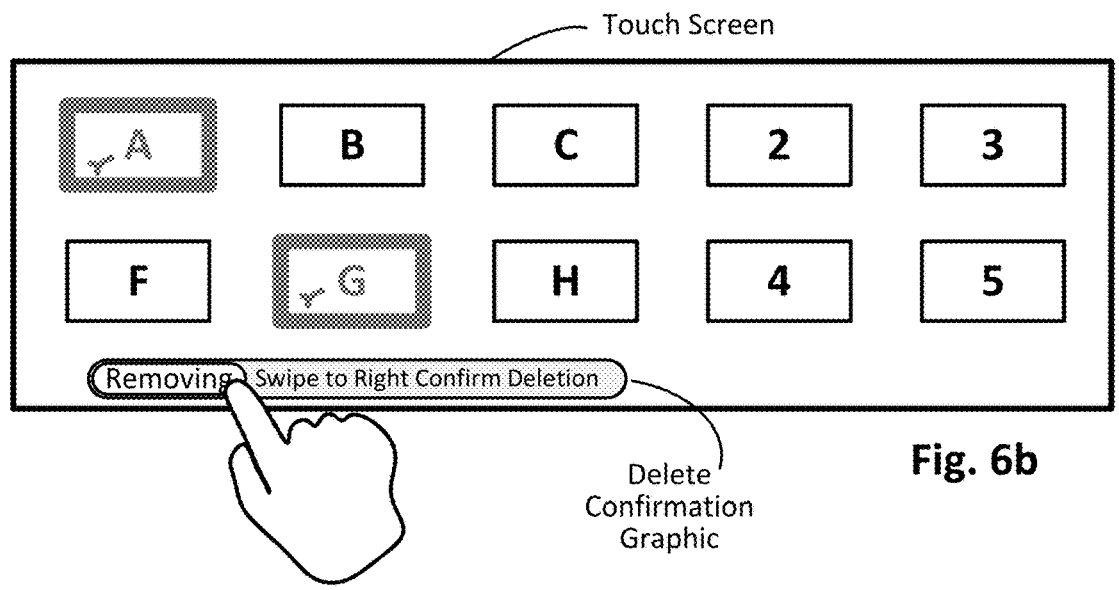
Figure 6C:
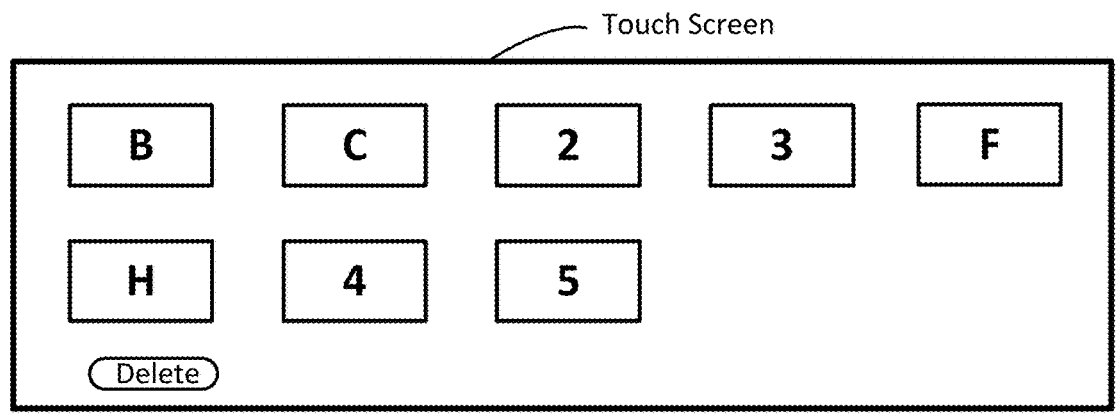

FIGS. 6a-c collectively illustrate an example delete confirmation mode that can be applied to a touch sensitive display of an electronic device, in accordance with another embodiment of the present invention. As can be seen, the touch screen of the device is displaying a variety of consumable content or files labeled with numbers or letters in this particular example. Content may be selected in any suitable manner using a stylus or other implement, the user's finger, or any other selection method. In this example, the user has selected the content labeled A and G, and the selected content is highlighted with a bold outline and a check mark on the content icons. Such optional outlining or highlighting may assist the user in identifying what data will be deleted before performing the delete action. In some embodiments, once content has been selected, a delete UI push-button may appear on the touch screen, as shown in FIG. 6a. In other embodiments, the delete UI push-button may be displayed before content selection, or the delete command may be activated through an options menu or some other appropriate user input technique.

In one example embodiment, once the user has tapped the delete button, a delete confirmation graphic may be displayed which prompts the user to perform a delete confirmation swipe gesture in order to confirm the delete command, as shown in FIG. 6b. In this particular example, the delete confirmation swipe gesture is a left-to-right swipe gesture performed along a shaded delete confirmation path. In some embodiments, once the user has performed the initial delete command but before the delete confirmation swipe gesture has been performed, the highlighting of the selected content may change, thus showing the content with a diminished appearance (partially shaded, shaded in a lighter color or tone, or appearing partially transparent). In this particular example, the highlighting of content A and G changes to a lighter shade once the delete confirmation mode is activated. Note that in some embodiments, if the user presses the delete UI push-button, the selected content may still diminish in appearance before the user either begins performing the delete confirmation swipe gesture or abandons the delete confirmation mode. In some embodiments, the delete confirmation mode may be abandoned by tapping a portion of the screen not associated with the delete confirmation graphic, or pressing the home button (FIG. 1a). In such cases, once the delete confirmation mode has been abandoned the selected content may return to its original highlighted appearance. In some embodiments, the device may begin deleting selected content once the user begins performing the delete confirmation gesture, while in other embodiments the content deletion may begin only after the delete confirmation gesture has been completed. As can be seen in the example shown in FIG. 6c, once the delete confirmation swipe gesture has been completed, the selected files are deleted and the remaining content may be rearranged on the screen. Other embodiments may leave files in their original location to show spaces associated with the deleted content.

In another embodiment, the degree to which the items being deleted are diminished in appearance may vary as the user performs the delete confirmation swipe gesture or retraces that swipe gesture. For example, the delete confirmation graphic may include a slider and the items to be deleted may increasingly fade-away as the user swipes the slider. In such an example, when the user releases the slider at the end of its track or delete confirmation path, the items may already be effectively gone. If, however, instead of releasing the slider the user has a change of mind and begins to retrace the swipe gesture back to the original position, the items may gradually reappear.

Methodology

Figure 7:
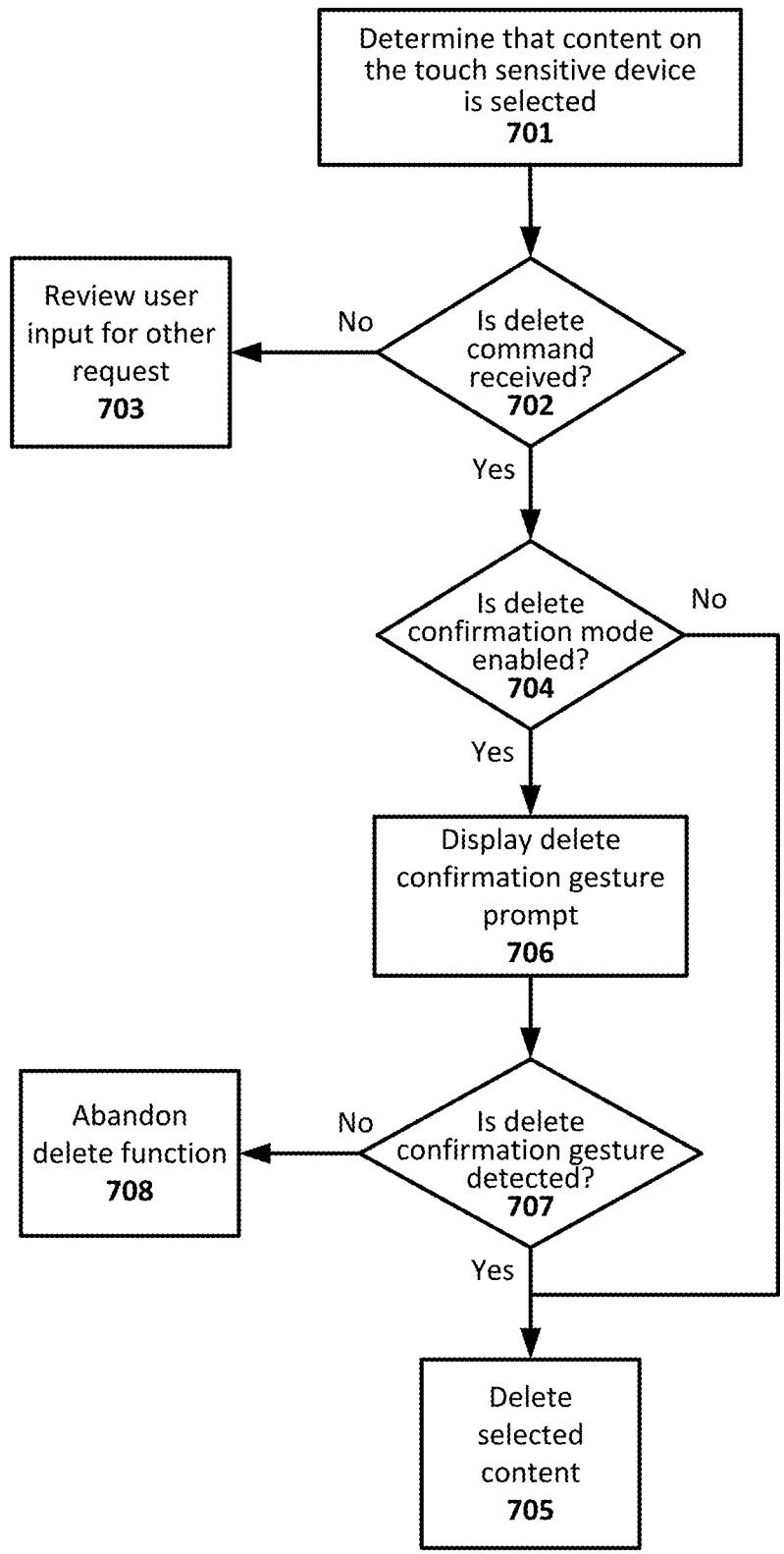
FIG. 7 illustrates a method for providing a swipe-based delete confirmation mode in an electronic touch screen device, in accordance with an embodiment of the present invention.

FIG. 7 illustrates a method for providing a swipe-based delete confirmation mode in an electronic touch screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the UI can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a swipe gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including a delete confirmation mode as variously described herein, as will be appreciated in light of this disclosure.

In this example case, the method includes determining 701 that content on the touch sensitive device is selected. As described above, content may be selected in any suitable manner using a stylus, the user's finger, or any other selection method. Once it has been determined that content is selected, the method may continue with determining 702 whether a delete command has been received by the device. In some embodiments, the delete command may be received through pressing the delete button of a keyboard attached to the device, pressing the delete button of a virtual keyboard displayed on the touch screen device, selecting the delete function from an options menu, pressing a UI delete button displayed on the device, or any other suitable user input means. If no delete command is received, any user input may be reviewed 703 for some other request or command. If a delete command is received, the method may continue with determining 704 whether the delete confirmation mode is enabled. In some embodiments the delete confirmation mode may be enabled only for delete commands received through the touch screen device, or only for those received through a real or virtual keyboard. In still other embodiments, the delete confirmation mode may be enabled on a content or application specific basis. In such an embodiment, the delete confirmation mode may be enabled when deleting entire files or documents, and not enabled when merely deleting content within a file or document. Many other configuration options for the delete confirmation mode will be apparent in light of this disclosure. As previously explained, the delete confirmation mode may be always enabled and configured from the factory in some embodiments, while other embodiments may be configured and/or enabled by the user. To this end, the determination at 704 ensures that the delete confirmation mode is a possible option for the selected content. If the delete confirmation mode is not enabled, the method may continue with deleting 705 the selected content.

If the delete confirmation mode is enabled, the method may continue with displaying 706 a delete confirmation gesture prompt. In some embodiments, the delete confirmation prompt may be part of a delete confirmation graphic displayed on the touch sensitive screen. In some such embodiments the delete confirmation graphic may include a UI delete button and a delete confirmation swipe path, or just a swipe path. In other embodiments, the confirmation gesture prompt may be displayed to the user through a delete confirmation pop-up window, as described in reference to FIG. 5*b*. Once the delete confirmation gesture prompt is displayed, the method may continue with determining 707 whether a delete confirmation gesture is detected. In some embodiments, the delete confirmation gesture may be a swipe motion along a delete confirmation path and may be performed with the user's finger, a stylus, or any other suitable implement. If the delete confirmation gesture is not detected, the method may continue with abandoning 708 the delete function. In some embodiments, the delete function may be abandoned if the delete confirmation gesture is not detected within a specified period of time (e.g., after the delete confirmation gesture prompt is displayed for five seconds), and such a time period may be hard coded or user configurable. In other embodiments, the delete function may be abandoned if the delete confirmation gesture is not properly performed (e.g., if the user does not properly trace a finger along a delete confirmation path). In still other embodiments, the delete function may be abandoned by closing the delete confirmation pop-up window instead of performing the delete confirmation swipe gesture. If, however, the delete confirmation gesture is detected 707, the method may continue with deleting 705 the selected content.

Numerous variations and configurations will be apparent in light of this disclosure. For example, one example embodiment provides a device including a touch screen display for displaying content to a user and allowing user input. The device also includes a user interface including a swipe-based delete confirmation mode that can be activated in response to a delete command, wherein the delete confirmation mode is configured to delete selected content in response to a delete confirmation swipe gesture. In some cases, the delete confirmation mode is further configured to ignore the delete command if a delete confirmation swipe gesture is not detected within a specified period of time. In some cases, the delete confirmation mode is further configured to cause display of a delete confirmation pop-up window to the user, the delete confirmation pop-up window prompting the user to perform the delete confirmation swipe gesture. In some such cases, the delete confirmation mode is further configured to abandon the delete command in response to the user closing the delete confirmation pop-up window. In some cases, the delete confirmation swipe gesture includes dragging a UI control feature along a delete confirmation swipe path. In some cases, the delete confirmation swipe gesture is performed along a delete confirmation swipe path that is graphically displayed and includes a prompt. In some cases, the delete confirmation mode is further configured to provide a diminished view of the selected content once a delete operation has been initiated but prior to completing a delete confirmation swipe gesture. In some cases, the delete command and the delete confirmation swipe gesture are combined into a single touch screen gesture. In some cases, the delete confirmation mode is further configured to display an animation as content is deleted, the animation showing content being discarded. In some cases, the selected content has a diminished appearance while the delete confirmation mode is activated, and a swipe path that the delete confirmation swipe gesture must follow is displayed, the path being annotated with a directional prompt.

Another example embodiment of the present invention provides a mobile computing system including a processor and a touch screen display for displaying content to a user and allowing user input. The system also includes a user interface executable on the processor and including a swipe-based delete confirmation mode that can be activated in response to a delete command via the touch screen display, wherein the delete confirmation mode is configured to display a swipe path and to delete selected content in response to a delete confirmation swipe gesture performed along the swipe path. In some cases, the delete confirmation mode is configured to ignore the delete command if a delete confirmation swipe gesture is not performed.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to receive at the electronic device a delete command. The process is also configured to display on the electronic device a delete confirmation swipe gesture prompt, and to delete selected content on the electronic device in response to a delete confirmation swipe gesture. In some cases, the process is further configured to ignore the delete command if the delete confirmation gesture is not detected within a specified period of time. In some cases, the delete confirmation swipe gesture prompt includes a delete confirmation pop-up window, the delete confirmation pop-up window prompting the user to perform the delete confirmation swipe gesture. In some cases, the process is further configured to ignore the delete command if the delete confirmation pop-up window is closed by the user. In some cases, an animation is displayed as selected content is deleted, the animation showing content being discarded. In some cases, the delete command and the delete confirmation gesture are combined into a single touch screen gesture. In some cases, the delete confirmation swipe gesture includes a sweeping drag gesture performed along a displayed delete confirmation swipe path. In some cases, the selected content has a diminished appearance after the delete command has been received and before the delete confirmation swipe gesture has been completed.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system, comprising:
one or more processors;
a user interface executable by the one or more processors and including a swipe-based confirmation mode that is activated in response to user input requesting performance of a function, wherein once activated, the swipe-based confirmation mode is configured to
transition at least a portion of a display to an initial diminished appearance, and
cause display, on the display, of a swipe path that includes a directional prompt, the swipe path for allowing a user to confirm performance of the function in response to a swipe gesture performed along the swipe path, wherein the initial diminished appearance becomes increasingly further diminished as the swipe gesture progresses along the swipe path in a direction indicated by the directional prompt.

2. The system of claim 1, wherein the swipe-based confirmation mode is further configured to exit the swipe-based confirmation mode if a cancel input is received.

3. The system of claim 1, wherein the function comprises a power off function.

4. The system of claim 1, wherein the function comprises a delete function.

5. The system of claim 1, wherein a sound accompanies completion of the swipe gesture.

6. The system of claim 5, wherein the sound is a swoosh sound.

7. The system of claim 1, wherein the swipe gesture follows a path in one single direction.

8. The system of claim 1, wherein the swipe-based confirmation mode is further configured to cause display of a virtual push button at the end of the swipe path.

9. The system of claim 1, wherein the swipe-based confirmation mode is further configured to cease in response to engagement of a physical button of the system.

10. The system of claim 1, wherein the swipe-based confirmation mode is further configured to cause the initial diminished appearance to increasingly reappear as the swipe gesture progresses back along the swipe path in a direction opposite the direction indicated by the directional prompt.

11. The system of claim 1, wherein the swipe-based confirmation mode is user-configurable.

12. The system of claim 1, further comprising an input sensor configured to translate touch-based input, including the swipe gesture, into an electrical signal.

13. The system of claim 1, wherein the input sensor comprises an in-plane switching panel or an electro-magnetic resonance sensor grid.

14. A system, comprising:
   one or more processors; and
   a user interface executable by the one or more processors and that is activated in response to user input requesting performance of a function, wherein once activated, the user interface is configured to
   transition at least a portion of a touchscreen display to an initial diminished appearance, and
   cause display, on the display, of a swipe path, the swipe path for allowing a user to confirm performance of the function in response to a swipe gesture performed along the swipe path, wherein the initial diminished appearance becomes increasingly further diminished as the swipe gesture progresses along the swipe path in a first direction, and wherein the initial diminished appearance increasingly reappears as the swipe gesture progresses back along the swipe path in a second direction opposite the first direction.

15. The system of claim 14, wherein the swipe-based confirmation mode is further configured to exit the swipe-based confirmation mode if a cancel input is received.

16. The system of claim 14, wherein the function comprises a power off function.

17. The system of claim 14, wherein the function comprises a delete function.

18. A mobile computing device, comprising:
   a physical power button;
   a touchscreen display; and
   a touch-based user interface control feature displayable on the display and including a slide bar usable to confirm a power off request initiated by engagement of the physical power button, wherein at least a portion of the display transitions to an initial diminished appearance in response to the request, and wherein the initial diminished appearance becomes increasingly further diminished as the slide bar is dragged along a path in a first direction, and wherein the initial diminished appearance increasingly reappears as the slide bar is dragged back along the path in a second direction opposite the first direction.

19. The mobile computing device of claim 18, wherein the mobile computing device is a smartphone or a tablet computer.

20. The mobile computing device of claim 18, wherein the function comprises a power off function or a delete function.

\* \* \* \* \*

UNITED STATES PATENT AND TRADEMARK OFFICE
CERTIFICATE OF CORRECTION

PATENT NO. : 11,320,931 B2  
APPLICATION NO. : 17/227728  
DATED : May 3, 2022  
INVENTOR(S) : Amir Mesguich Havilio Page 1 of 1

It is certified that error appears in the above-identified patent and that said Letters Patent is hereby corrected as shown below:

On the Title Page

Item (63) "Related U.S. Application Data", please correct the first listed U.S. application number from "16/707,573" to -- 16/707,576 --.

Signed and Sealed this  
Fourteenth Day of June, 2022

Katherine Kelly Vidal  
*Director of the United States Patent and Trademark Office*